April 14, 1959     W. J. OPOCENSKY     2,881,630
TRANSFER MECHANISM

Filed Oct. 9, 1956     2 Sheets-Sheet 1

*INVENTOR.*
WILLARD J. OPOCENSKY
BY

ATTORNEY

April 14, 1959     W. J. OPOCENSKY     2,881,630
TRANSFER MECHANISM

Filed Oct. 9, 1956     2 Sheets-Sheet 2

*INVENTOR.*
WILLARD J. OPOCENSKY
BY

ATTORNEY

United States Patent Office 2,881,630
Patented Apr. 14, 1959

2,881,630

TRANSFER MECHANISM

Willard J. Opocensky, Glendale, Calif., assignor to Librascope, Incorporated, Glendale, Calif., a corporation of California Application October 9, 1956, Serial No. 614,987

6 Claims. (Cl. 74—435)

This invention relates to a novel and improved transfer mechanism for a mechanical counter, and particularly to the structure of the locking disc and the mutilated gear member in a mechanical counter.

One object of this invention is to provide a transfer mechanism which has an absolute minimum of backlash. In counters made according to the teachings of the prior art the diameter of the locking disc is the same as the outside diameter of the toothed member attached to said disc. Prior mutilated gear members also have gear teeth of conventional shape. This has proven undesirable because it permits backlash between the driving member and the driven member during the arc of rotation at which the transfer of motion occurs.

A further object of this invention is to obviate these objections by providing a transfer mechanism in which the locking disc is of a greater diameter than the teeth mounted thereon and the faces of the mutilated teeth which contact the locking disc are concave to slidably fit against the periphery of said disc.

Briefly described, the present invention obviates these objections by the combination of the diameter of the locking disc, the length of the teeth attached thereto and relative thereto, and by the shape of the teeth on the driven member.

Figure 1:
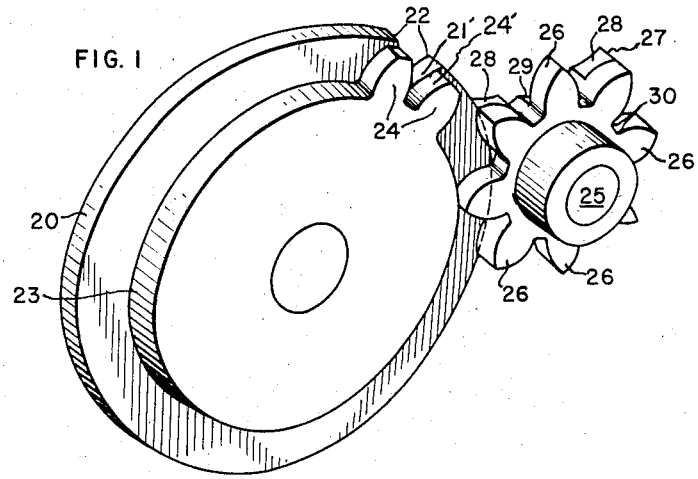

Other objects and advantages of this invention will become apparent as the discussion proceeds and are taken in connection with the accompanying claims and drawings, in which:

Figure 1 is a perspective view of the transfer mechanism embodied in this invention;

Figures 2, 3, 4, 5 and 6 are top plan views showing the respective positions of the driving and driven members as the driving member passes through its arc of rotation causing the driven member to rotate; and Figs. 7, 8, 9, 10 and 11 are bottom plan views corresponding to Figs. 2, 3, 4, 5 and 6, respectively.

Turning now to a more detailed description of this invention, the numeral 20 designates a locking disc generally, having a cutaway portion 21, as shown in Fig. 1 and Figs. 7 through 11, inclusive. The cutaway portion 21, as can be seen from the drawings, forms an apex at 22 on each side of the cutaway portion at the line of contact between the cutaway portion 21 and the periphery of the locking disc 20.

Securely affixed to the locking disc 20 is a partially toothed member 23. As can be seen from Fig. 1 the member 23 is provided with a pair of complete teeth 24, which it is to be pointed out here, dimensionally are the same as a conventional gear and the radius of the disc is greater than the radius of the O.D. of the teeth 24. This difference in radius is illustrated clearly in Fig. 1 and Figs. 2 through 6, inclusively. It is to be understood that while the precise difference in radius between the teeth 24 and the locking disc 20 is not material in the practicing of my invention, it is emphasized that this difference must exist. The toothed member 23 can be formed integral with the locking disc 20 or may be attached thereto by means of rivets or the like, or, of course, may be welded thereon.

As will be apparent from a close observance of all of the figures, the teeth 23 are positioned in relation to the cutaway portion 21 of the locking disc 20 so that the faces 24' of the pair of teeth 24 are coincident with the faces 21' formed by the cutaway portion 21. The faces 21' of the locking disc 20 extending beyond the teeth 24 are a continuation of the tooth profile of the teeth 24.

Figure 7:
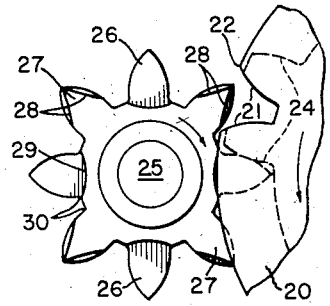

The numeral 25 designates generally a mutilated tooth member having an even number of teeth 26 disposed in a common plane at a right angle to the axis. While it has been found that the optimum efficiency will be obtained if there are eight teeth 26, it is to be understood that any even number can be employed without departing from the spirit of my invention. In a plane parallel to that in which teeth 26 are disposed, there are mutilated teeth 27, as shown in Figs. 7 through 11, inclusive. In the embodiment illustrating my invention there are four mutilated teeth 27 used, and as shown they are alternately spaced with respect to the teeth 26. As will be apparent from a study of Fig. 1 and also as shown in Figs. 7 through 11, inclusively, the end portions or faces of the mutilated teeth 27 are provided with concave surfaces 28. Reference is made particularly to Figs. 7 and 11 in respect to a more detailed explanation and description of these concave surfaces 28 each of which is of an arc equal to the radius of the outside diameter or periphery of the locking disc 20 and in the assembled transfer mechanism the centers of the locking disc 20 and the mutilated gear member 25 are spaced so that each pair of facing concave surfaces 28 are in sliding contact with the periphery of the locking disc 20. Accordingly, the axis of the locking disc 20 and the mutilated gear member 25 are positioned so that the radii of any pair of concave surfaces 28 is always equal to the radius of the locking disc 20.

It has been found in practice that the mutilated gear member 25 can be more economically constructed by first hobbing a complete gear tooth and then cutting away every other tooth in the plane of the mutilated teeth 27 by means of a cutter having a radius somewhat smaller than the locking disc 20. This cut must be of a depth to permit clearance of the apices 22, as shown at 29. On the other hand, of course, the mutilated gear member embodied in my invention could be formed by using two separate gear members welded or otherwise securely fastened together.

Figure 8:
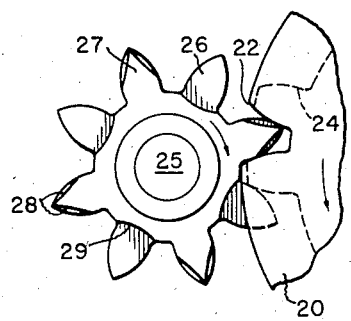
Figure 9:
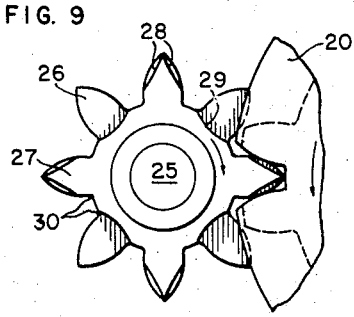
Figure 10:
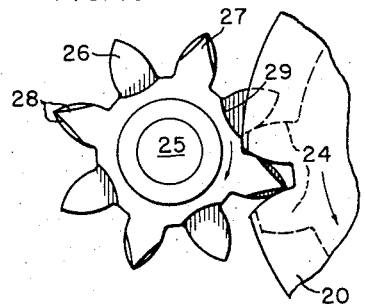
Figure 11:
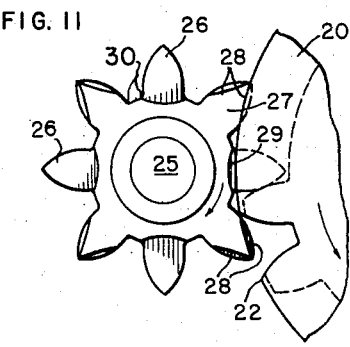

In addition to the cutaway portions 29 there is provided within the fillet formed between the alternate mutilated teeth 27 and on each side of the base of each of the mutilated teeth 27 a shoulder 30, as best shown in Figs. 7 through 11, inclusive, which is for the purpose of providing a bearing surface for the apex 22. Figures 8 and 10 illustrate the co-action between the apex 22 and the shoulders 30.

Figure 2:
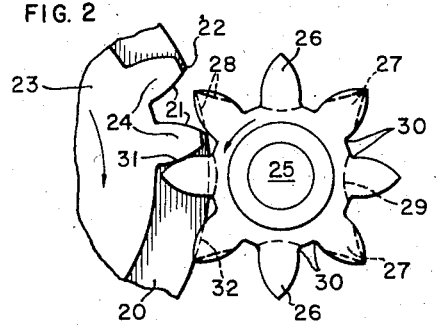
Figure 3:
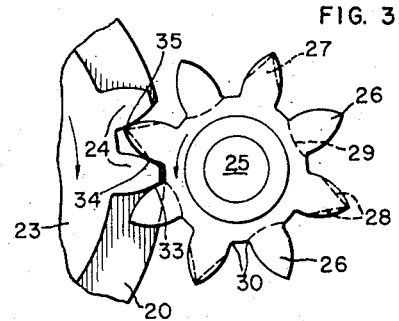
Figure 4:
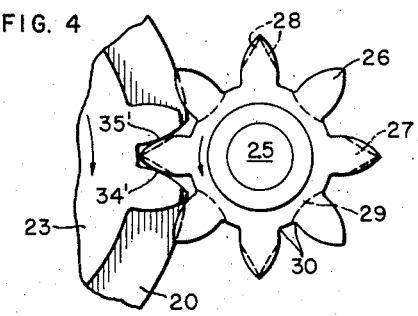
Figure 5:
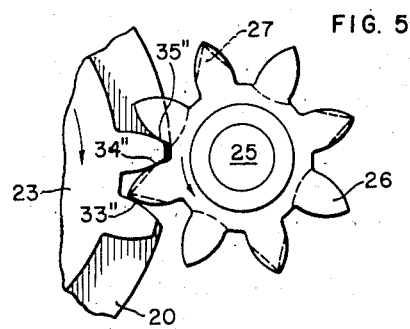
Figure 6:
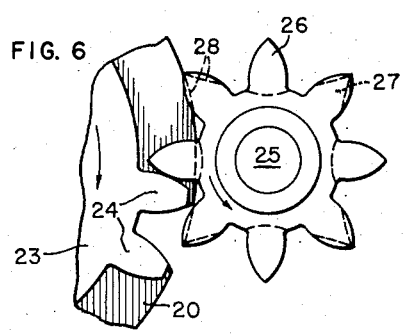

For an understanding of the operation of my invention attention is invited to Figs. 2 to 6 and 7 to 11, inclusive. Figs. 2 and 7 show the same position of the locking disc and mutilated gear, Figs. 3 and 8 the same, Figs. 4 and 9, the same, Figs. 5 and 10 the same and Figs. 6 and 11, the same. Looking now at Figs. 2 and 7, the relative positions of the locking disc 20 and the mutilated gear member 25 are shown immediately before rotation of the mutilated gear member, the locking disc 20 turning in a clockwise direction and the mutilated gear 25 turning in a counterclockwise direction. It is to be noted that the locking disc and mutilated gear member are positioned such that the apex 22 on the locking disc 20 has just finished making a sliding contact with the concave surface 28 and there is now a slight clearance between the tooth 27 and the apex 22. At this stage of the rotation of the disc 20 and gear 25 there are but two points of contact indicated by the numerals 31 and 32, between the disc 20 and the mutilated member 25. This, and the complementary stage illustrated in Fig. 6 are the only two stages at which any backlash at all can be present in this gear movement and this amount of backlash is only the small amount permitted by the distance between the apex 22 and the gear tooth 27. Figs. 3 and 8 show the position of the gears at an instant later than that shown in Figs. 2 and 7, and here backlash has been reduced to zero because by this time there actually are three points of contact, 33, 34 and 35 between the teeth 24 and the teeth 26.

At the next instant of rotation shown in Figs. 4 and 9 the contact 33 has broken away, but contacts 34 and 35 have moved to points 34' and 35', and backlash is still at zero.

As the gears continue to rotate Figs. 5 and 10 point out how there are again three contact points 33", 34" and 35". In the positions of the teeth shown in Figs. 5 and 10 and 3 and 8, there being contact at all three points, 33, 34 and 35, it is impossible for any backlash to occur as the gears are locked in both directions relative to each other. The gears have continued to turn in Figs. 6 and 11 until the mutilated gear has completed a full one quarter turn, and at this instant there occurs the second stage at which backlash in a minor amount is permitted by the clearance between the apex 22 and the tooth 27.

As shown in Figs. 7 to 11, it is to be noted that at the start of the rotation of the mutilated gear member 25 there is a sliding contact between the outer periphery of the locking disc 20 and the concave surfaces 28 of the mutilated gear teeth 27. The sliding contact between the outer periphery of the locking disc 20 and the concave surfaces 28 of the mutilated gear teeth 27, positively prevents the mutilated gear member 25 from any movement and provides a surface contact to absorb the hammer blows between the two gears as opposed to the line point of contact of the previous art.

The cutaway depth 29 permits clearance of the apices 22 as each passes by this point and the shoulders 30 provide an additional bearing surface for the prevention of backlash immediately after the start of the rotation of the mutilated gear member 25.

Having described my invention in detail, I claim:

1. A transfer mechanism for a mechanical counter comprising a locking disc having a recess therein and a pair of teeth thereon the opposite faces of said teeth being coincident with the faces formed by said recess, the radius of said disc being greater than that of said pair of teeth, and a mutilated tooth member having an even number of teeth in one plane positioned to make alternate meshing contact with said pair of teeth and a second set of mutilated teeth disposed in a plane parallel to said first mentioned plane equal in number to one half the number of teeth on said first mentioned plane, each face of said last mentioned mutilated teeth being so shaped as to make a slidable surface contact with the periphery of said locking disc.

2. A transfer mechanism for a mechanical counter comprising a locking disc having a recess therein forming a pair of apices in the periphery of said disc and a pair of teeth thereon the opposite faces of said teeth being coincident with the faces formed by said recess, the radius of said disc being greater than that of said pair of teeth, and a mutilated tooth member having an even number of teeth thereon in one plane positioned to make alternate meshing contact with said pair of teeth and a second set of mutilated teeth disposed in a plane parallel to said first mentioned plane and equal in number to one half the teeth on said first mentioned plane, each face of said last mentioned mutilated teeth being concave in shape, such concavity having a radius equal to the radius of said locking disc and being in slidable contact with the periphery of said disc.

3. A transfer mechanism according to claim 2 in which each of said last mentioned teeth is provided with a notch adjacent the base thereof adapted to receive one of the apices formed by the recess and the periphery of said locking disc.

4. A transfer mechanism for a mechanical counter comprising a lock disc having a recess therein intersecting the periphery thereof and a pair of teeth thereon, the opposite faces of said teeth being coincident with faces formed by said recess, the radius of said disc being greater than that of said teeth, and a mutilated tooth member having an even number of teeth thereon in one plane positioned to make alternate meshing contact with said pair of teeth and a second set of mutilated teeth disposed in a plane parallel to said first mentioned plane and equal in number to one half the teeth on said first mentioned plane, each face of said last mentioned mutilated teeth being shaped to make a slidable surface contact with the periphery of said locking disc.

5. A transfer mechanism for a mechanical counter comprising a locking disc having a recess therein intersecting the periphery thereof forming apices therewith and a pair of teeth thereon, the faces of said teeth being coincident with the faces formed by said recess, the radius of said disc being greater than that of said teeth, and a mutilated tooth member having an even number of teeth thereon on one side thereof and in a plane at a right angle to the axis, each tooth making alternate meshing contact with said pair of teeth, the other side of said mutilated tooth member having alternate teeth removed therefrom in a plane parallel to the first mentioned plane, each face of each remaining tooth being concave in shape, such concavity having a radius equal to the radius of said locking disc, the centers of said disc and said mutilated tooth member being so spaced that the concave faces of said last mentioned teeth make a slidable surface contact with the periphery of said disc, each of said remaining teeth being provided with a notch adjacent the base thereof adapted to receive one of the apices formed by the recess and the periphery of said locking disc.

6. A transfer mechanism for a mechanical counter comprising a locking disc having a recess therein and a pair of teeth thereon, the opposite faces of said teeth being coincident with the faces formed by said recess and a mutilated tooth member having an even number of teeth thereon in one plane positioned to make alternate meshing contact with said pair of teeth and a second set of mutilated teeth disposed in a plane parallel to said first mentioned plane equal in number to one half the teeth on said first mentioned plane, each face of each of said last mentioned mutilated teeth being so shaped as to make a slidable surface contact with the periphery of said locking disc and each of said last mentioned teeth being provided with a notch adjacent the base thereof adapted to receive one of the apices formed by the recess and the periphery of said locking disc.

References Cited in the file of this patent

UNITED STATES PATENTS

| Number | Name | Date |
|---|---|---|
| 1,216,759 | Wright | Feb. 20, 1917 |
| 1,370,540 | Hussey | Mar. 8, 1921 |
| 1,243,374 | Wright | Oct. 16, 1917 |
| 1,671,553 | Sheldrick | May 29, 1928 |
| 1,758,206 | Van Ryan | May 13, 1930 |
| 2,483,359 | Bliss | Sept. 27, 1949 |

FOREIGN PATENTS

| 41,778 | France | Apr. 13, 1933 |